US005507311A

United States Patent [19]
Combe

[11] Patent Number: 5,507,311
[45] Date of Patent: Apr. 16, 1996

[54] PRESSURE REGULATOR FOR A PRESSURE COOKER

[75] Inventor: Gilles Combe, Argenton sur Creuse, France

[73] Assignee: Societe Industrielle de Transformation de Metaux—SITRAM, Saint-Benoit-Du-Sault, France

[21] Appl. No.: 452,277

[22] Filed: Aug. 26, 1995

[30] Foreign Application Priority Data

Jun. 2, 1994 [FR] France .................................. 94 06752

[51] Int. Cl.$^6$ .................................................. F16K 17/06
[52] U.S. Cl. ........................... 137/524; 137/529; 137/530; 137/534; 220/203.04
[58] Field of Search .............................. 220/203; 137/524, 137/529, 530, 534

[56] References Cited

U.S. PATENT DOCUMENTS

| | | | |
|---|---|---|---|
| 1,737,588 | 12/1929 | Hopkins | 137/534 X |
| 1,743,350 | 1/1930 | Hopkins | 137/534 X |
| 2,524,996 | 10/1950 | Sayers | 137/534 X |
| 2,536,505 | 12/1950 | Kircher | 137/529 |

FOREIGN PATENT DOCUMENTS

| | | |
|---|---|---|
| 932559 | 1/1941 | France . |
| 1166790 | 2/1957 | France . |
| 1195642 | 5/1958 | France . |
| 579269 | 6/1933 | Germany . |
| 284689 | 11/1952 | Switzerland . |

Primary Examiner—Robert G. Nilson
Attorney, Agent, or Firm—Sixbey, Friedman, Leedom & Ferguson; Gerald J. Ferguson, Jr.

[57] ABSTRACT

A pressure cooker pressure regulator having at least two operating thresholds, the regulator being of the type comprising a valve body fixed to the lid of a pressure cooker and having a valve seat formed therein, and a needle carrying a rating mass and bearing against the seat, the regulator is such that the needle is slidably mounted relative to the rating mass, that a spring is interposed between the needle and the rating mass, and that means are provided for adjusting the force exerted by the spring on the needle and comprising means selectively implemented to oppose upward displacement of the rating mass relative to the valve body under the effect of pressure applied to the needle via the seat.

8 Claims, 2 Drawing Sheets

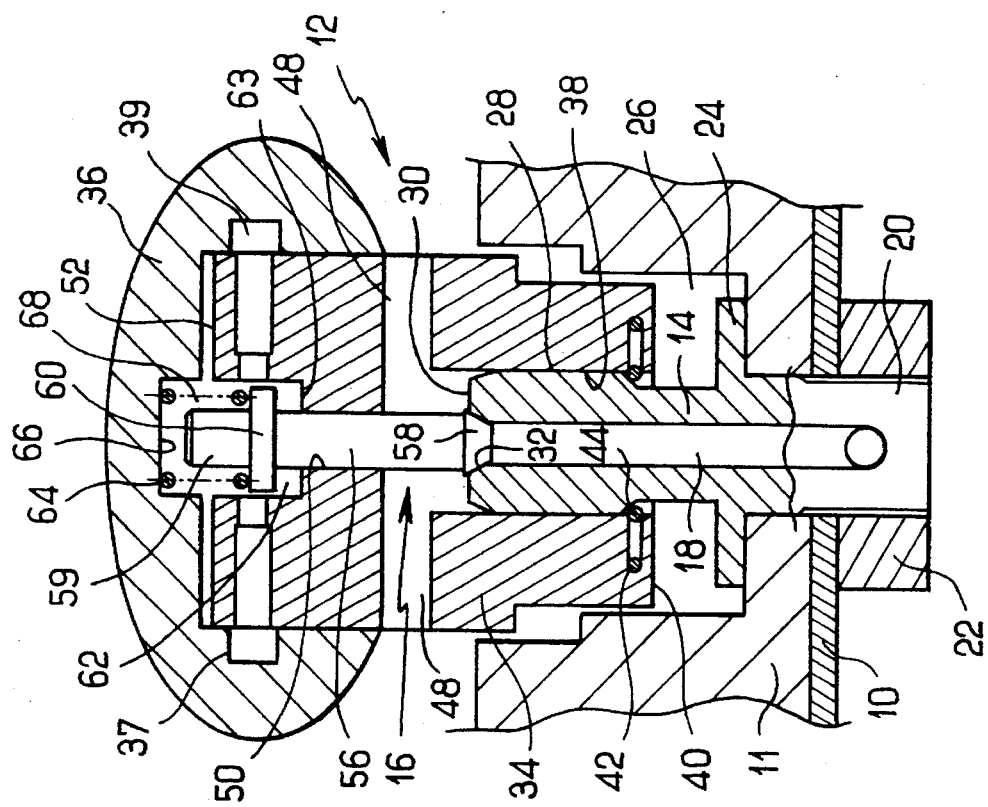
FIG._2
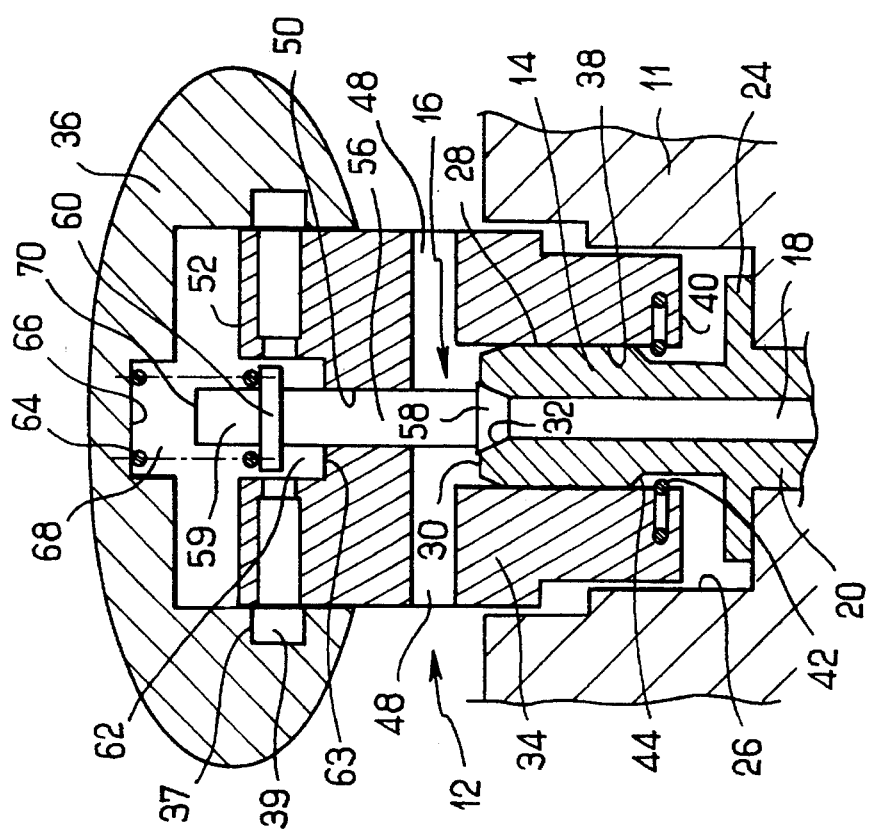
FIG._1

PRESSURE REGULATOR FOR A PRESSURE COOKER

The present invention relates to a pressure regulator for a pressure cooker.

BACKGROUND OF THE INVENTION

A pressure cooker is a receptacle, e.g. a deep pan, which is hermetically sealed by a lid provided with a special clamping device, and within which steam that is obtained by boiling water raises the internal temperature to higher than 100° C. so as to shorten ordinary cooking time.

The pressure regulator associated with the lid is designed to maintain the pressure inside the pressure cooker at a reference value and to exhaust excess steam that would otherwise tend to increase the pressure to a value above the reference. This serves to regulate the cooking temperature.

In a conventional design, the regulator is of the type comprising a valve body designed to be fixed to the lid of the pressure cooker and in which a valve seat is formed that co-operates by gravity with a valve closure element in particular in the form of a needle, which carries a rating mass that is mounted to slide vertically relative to the valve body.

An appropriate choice of rating mass determines the reference value, i.e. the pressure that will be established inside the pressure cooker and above which the assembly constituted by the rating mass and the closure element rises relative to the valve body, thereby opening the valve and discharging excess pressure.

In certain applications, it has been found necessary for the user to be able to adjust the value of the pressure that exists inside the pressure cooker, and in particular to be able to select, e.g. between at least two pressure values, in order to improve performance and the way in which the pressure cooker is used by selecting cooking temperature and/or cooking duration.

In a first known design, the user may select the reference value by selecting from two or more rating masses, with the selection directly determining cooking temperature.

That solution is satisfactory from the functional point of view, but it suffers from the drawback of providing at least two rating masses together with the pressure cooker, each mass including its own closure needle.

In addition, if the user observes that the wrong rating mass has been selected initially, then it is necessary for the pressure inside the pressure cooker to be exhausted completely or in part by removing the wrong needle prior to being able to install a different needle.

In a second design described and shown in document GB-A-2 115 524, a regulator is proposed that is constituted by a closure element that slides in a plug that is screwed to the body of the safety valve and that is urged resiliently in the closure direction by a rating spring which bears against the plug and against a shoulder of the closure element.

The bottom end of the closure element is a cylindrical rod that slides in a cylindrical bone in the valve body, and the initial setting for the rating value as exerted by the spring defines the strong beyond which the safety valve opens, thereby determining the rating of the regulator.

That design of regulator suffers from the drawback of requiring a lengthy and fiddly unscrewing operation when the user desires to exhaust all of the pressure inside the pressure cooker.

In addition, the top end of the closure element projects axially above the screw plug and it is possible to alter the setting of the rated pressure by accidentally pressing on the free end of the rod, and this may go so far as to prevent the regulator from operating at all. Finally, there is a risk of the bottom end of the rod becoming jammed in its bore.

Document EP-A-0 420 324 describes and shows a design in which the rating mass is provided with a pair of valve seats and associated closure elements.

To this end, the rating mass is of a particularly complex structure having two portions mounted to move relative to each other, each of which includes one of the needle-shaped closure elements.

As well as being complex in structure, that design also suffers from the drawback of requiring the two portions of the rating mass to be accurately positioned relative to each other in order to avoid the rated value of the regulator being indeterminate, i.e. situated in a range defined by the lower and upper rating values that are associated with operation of one or the other of the seat and closure element assemblies.

OBJECTS AND SUMMARY OF THE INVENTION

An object of the present invention is to provide a pressure cooker regulator that makes at least two valve rating values available and that remedies the drawbacks of the prior art solutions mentioned above.

To this end, the invention provides a pressure cooker pressure regulator having at least two operating thresholds, the regulator being of the type comprising a valve body fixed to the lid of the pressure cooker and having a valve seat formed therein, a needle bearing against the seat and carrying a rating mass slidably mounted on said needle, a rating spring being interposed between the needle and the rating mass, and adjustment means for adjusting the force exerted by the rating spring on the needle. According to a main characteristic of the invention, the adjustment means comprise means selectively implemented to oppose upward displacement of the rating mass relative to the valve body under the effect of pressure applied to the needle via the seat.

Thus, depending on whether the means for locking the rating mass relative to the valve body are put into operation or not, the mass is, or is not, free to slide relative to the valve body under the effect of the lifting force applied to the needle via the seat on which it rests. As a result, if the mass is free to slide, there is a first pressure regulation value corresponding to the gravity of the needle associated with the rating mass: this is the lower value. If the rating mass is locked in position, then the pressure must overcome the force applied to the needle by the spring, and that force is greater than the force of gravity as applied to the rating mass: the pressure value as regulated in this way is higher than the first regulated value and therefore corresponds to a higher cooking temperature being established inside the pressure cooker.

The means for opposing upward displacement of the rating mass comprise abutments provided in corresponding positions on the valve body and the rating mass, with the spring constituting the means for enabling them to come into or out of engagement depending on the degree to which it is compressed.

BRIEF DESCRIPTION OF THE DRAWINGS

Other characteristics and advantages of the invention appear from the following description of an embodiment and possible variants thereof.

Reference is made to the accompanying drawings, in which:

FIG. 1 is an axial section view through a pressure cooker pressure regulator made in accordance with the teaching of the invention-and shown in operation as set to a lower pressure value inside the pressure cooker;

FIG. 2 is a view similar to FIG. 1, in which the regulator is shown in operation as set to a higher pressure value inside the pressure cooker;

MORE DETAILED DESCRIPTION

Figure 5:
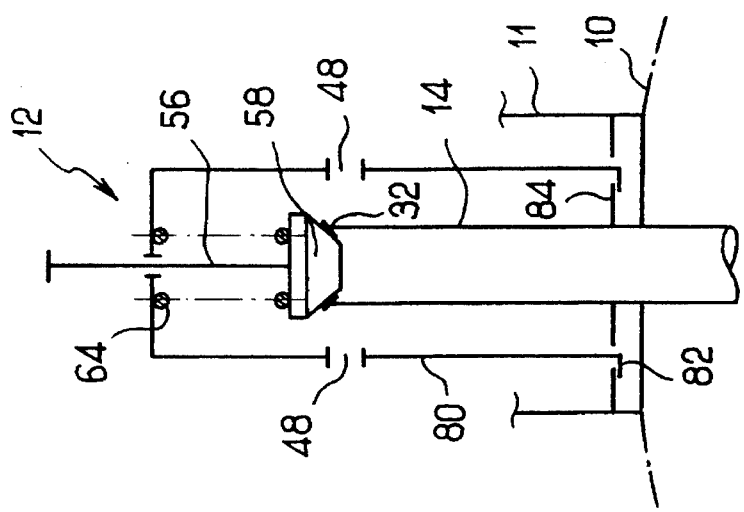
FIGS. 4 and 5 are diagrams showing a second variant of the same embodiment.

FIGS. 1 and 2 show a portion of the lid 10 of a pressure cooker surmounted by trim 11 and also shows a pressure regulator 12.

The regulator 12 is essentially constituted by a valve body 14 and by a gravity valve member 16 which is mounted to slide vertically on the valve body 14.

The valve body 14 is in the form of a cylindrical rod having a central bore 18 passing therethrough, the bottom end 20 of the body passing through the lid. 10 and being secured thereto by means of a nut 22.

The rod forming the valve body 14 has a collar 24 bearing against the bottom of a recess 26 in the trim 11 and it extends vertically in the form of a top main portion 28 of cylindrical outside shape.

The top face 30 of the valve body 14 includes a conical valve seat 32.

The gravity valve member 16 has both a cylindrical needle body 56 with a conical end 58 suitable for co-operating in sealing relationship with the valve seat 32, and also a two-portion rating mass: a lower first portion 34; and an upper second portion 36 mounted thereon to be displaceable relative to the first portion along the axis of the needle 56 and between two abutments.

The first portion 34 of the rating mass has a central bore 38 at its bottom end opening out into the bottom face 40 of said first portion 34 and enabling the rating mass to be installed vertically downwards (as shown in the figures) onto the valve body 14 so that the cylindrical surface 28 is slidably received in the bore 38.

When mounted on the valve body 14, the upward vertical stroke of the rating mass is limited by an elastically deformable ring 42 suitable for co-operating with an outside radial shoulder 44 formed for this purpose in the outside wall of the rod forming the valve body 14. Naturally, this disposition could be replaced by any equivalent device, and in particular by an opposite disposition, i.e. a resilient ring carried by the valve body and a shoulder formed on the rating mass.

To enable the valve member 16 to be installed on the valve body 14, or to enable it to be removed in order to release the pressure inside the pressure cooker, the resilient ring 42 is capable of retracting radially outwards into a groove 46 formed for this purpose in the bore 38 of the first portion 34.

The top portion of the bore 38 opens out into transverse channels 48 that allow the excess pressure to be exhausted to the atmosphere.

The top portion of the mass 34 includes a top bore 50 that opens out in the top face 52 and that slidably receives the needle body 56.

The bottom portion 34 is prevented from rotating, relative to the valve body 14, e.g. by means (not shown) disposed between its peripheral wall and the recess 26 in the trim 11.

The top end 59 of the needle 56 carries an external radial collar 60 which slides inside a larger-diameter portion 62 of the top bore 50 and which has a primary function of limiting the downward vertical stroke of the body 56 relative to the first portion 34 of the rating mass by engaging the bottom 63 of the large-diameter portion 62.

The collar 60 also serves as a thrust shoulder for a helical compression spring 64 interposed between the needle 56 and a thrust surface 66 formed facing the collar in a recess 68 formed in the top portion 36 of the rating mass 16.

By way of example, the top portion 36 may be molded out of plastics material, and it may be screw-mounted on said first portion 34 so as to be displaceable relative thereto, or it may be associated therewith by equivalent means such as the portions 34 and 36 having, between them, helical ramps 37 receiving corresponding studs 39 in this way, vertical displacement of the top portion 36 relative to the first portion 34 causes the thrust surface 66 to be displaced vertically relative to the first portion 34, thereby varying the force exerted by the spring 64 on the needle 56.

When the regulator is in the state shown in FIG. 1, the portions 34 and 36 of the rating mass are relatively far apart. The spring 64 is compressed solely by the weight of the rating mass which bears against the collar 60, and the regulator acts as a gravity valve member so that the pressure as regulated inside the pressure cooker then depends solely on the weight of the rating mass.

In this configuration, since the distance between the surfaces 63 and 66, minus the thickness of the collar 60, is greater than the uncompressed length of the spring 64 when the needle 56 Dears against the seat 32, the resilient ring 42 is below the shoulder 44, and the rating mass is free to slide vertically relative to the valve body 14, thereby enabling the regulator 12 to open whenever the pressure acting on the end 58 of the needle 56 is sufficient to lift the needle together with the rating mass so as to discharge a part of the pressure inside the pressure cooker.

In the state shown in FIG. 2, the portions 34 and 36 are moved closer together so that the distance between the surfaces 63 and 66, minus the thickness of the collar 60, is less than the uncompressed length of the spring 64. The spring 64 is then compressed and delivers a force that presses the collar 60 against the surface 63 (when the valve member is not co-operating with the valve body 14).

In this state, when the valve member 16 is placed on the valve body 14, the needle encounters the seat 32 before the resilient ring 42 has been received beneath the shoulder 44. When the resilient ring 42 is received beneath the shoulder the spring 64 exerts a reaction force on the rating mass tending to lift said mass relative to the needle 56 so as to keep the resilient ring 42 pressed against the shoulder 44.

In this state, it is the clamping force applied to the spring 64 that determines the value of the pressure inside the pressure cooker, above which the regulator opens by the needle 56 moving upwards against the force applied thereto by the adjustment spring 54 and independently of the rating mass.

The maximum value of the clamping force provided by the spring 64 results from the free end face 70 of the needle 56 coming into contact with the thrust surface 66 or by any other abutment means for the relative motion between the two portions 34 and 36 of the rating mass.

As can be seen by comparing FIGS. 1 and 2, the top portion 36 of the rating mass 16 constitutes an adjustment knob having an egg shape enabling the user to see the angular position of the top portion 36 relative to the bottom portion 34. Any means enabling said angular position to be observed by the user would suffice to inform the user about the working pressure that is to be established inside the pressure cooker. In particular, the egg shape of the portion 36 of the rating mass may be associated with index marks carried on the trim 11, i.e. stationary relative to the lid.

Figure 4:
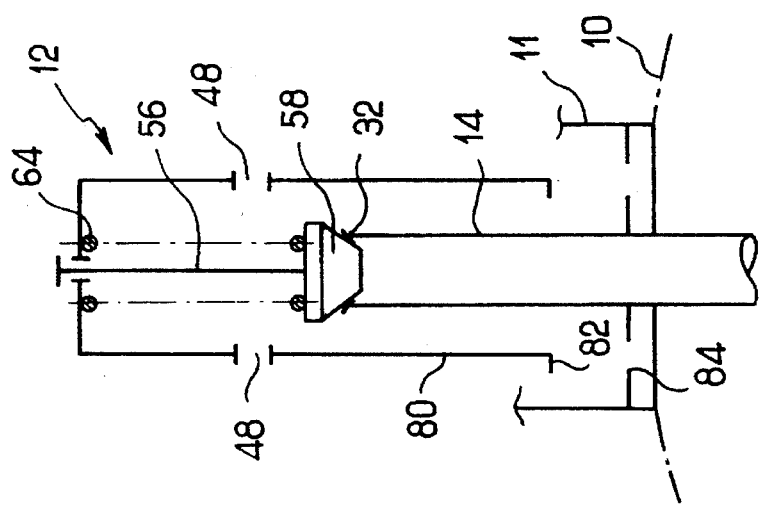
Figure 3:
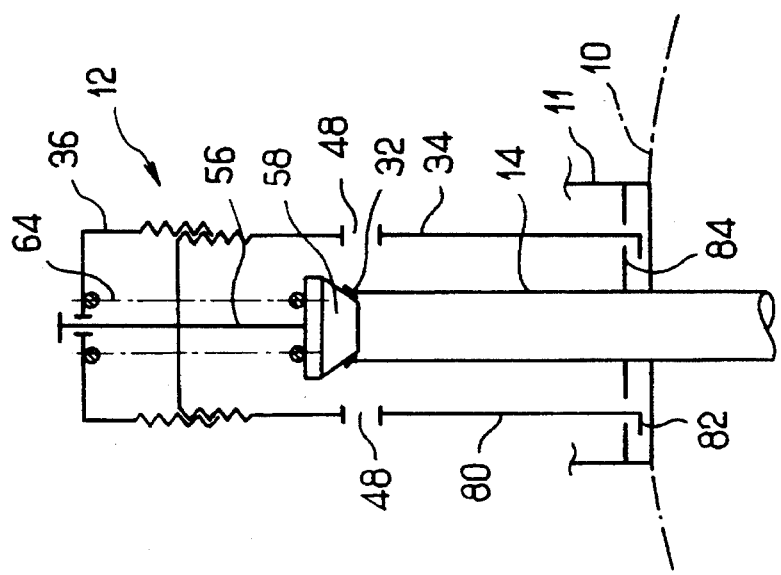
FIG. 3 is a diagrammatic view of a first variant of the embodiment shown in the preceding figures.

FIGS. 3, 4, and 5 are diagrams showing variants of the preferred embodiment of the invention as described above. Certain elements as already described are to be found in these figures, and they are given the same reference numbers.

FIG. 3 is a diagrammatic representation of the above-described embodiment in which the portions 34 and 36 co-operate mutually via a screw thread. The above-described function of the ring 42 and the shoulder 44 is performed in this case by the base 82 of the rating mass (implemented in this case as a cover 80 for the tubular valve body or endpiece 14) co-operating with a shoulder 84 secured to the lid or to its trim. This cooperation should be understood as constituting absence of contact (as shown) when the spring 64 is in the uncompressed state and as hooking engagement when the spring 64 is compressed by screwing the top portion 36 down onto the bottom portion 34. Various pressure reference values can thus be obtained depending on the extent to which the two portions 34 and 36 are screwed together, thereby determining various values for the working pressure inside the pressure cooker.

In FIGS. 4 and 5, the device shown represents a variant embodiment in which the regulator is either merely placed on the seat 32 and operates simply as a gravity valve mender (FIG. 4), or else is coupled via its rating mass or cover 86 to the lid 10 or to any element secured thereto, in which case the rating mass is constituted by a single part that is slidably mounted relative to the needle 56, with the action of engaging it to the lid requiring the spring 64 to be compressed so as to press the needle 56 against the seat 32 (FIG. 5). Two reference values can be obtained depending on whether or not the regulator is coupled to the lid.

I claim:

1. A pressure cooker pressure regulator having at least two operating thresholds, the regulator being of the type comprising a valve body fixed to the lid of the pressure cooker and having a valve seat formed therein, a needle bearing against the seat and carrying a rating mass slidably mounted on said needle, a rating spring being interposed between the needle and the rating mass, and adjustment means for adjusting the force exerted by the rating spring on the needle, wherein the adjustment means comprise means selectively implemented to oppose upward displacement of the rating mass relative to the valve body under the effect of pressure applied to the needle via the seat.

2. A regulator according to claim 1, wherein the means for opposing upward displacement of the rating mass comprise abutments provided in corresponding positions on the valve body and the rating mass, with the spring constituting the means for enabling them to come into or out of engagement depending on the degree to which it is compressed.

3. A regulator according to claim 1, wherein the spring is disposed between the needle and a facing thrust surface formed in the rating mass.

4. A regulator according to claim 3, wherein the rating mass is made in two portions, a first portion in which the needle is slidably mounted, and a second portion in which said thrust surface is formed, and which is mounted so as to be adjustable in position relative to the first portion.

5. A regulator according to claim 4, wherein the second portion of the rating mass is screw-mounted on the first portion.

6. A regulator according to claim 5, wherein the second portion of the rating mass includes means for visually identifying its angular position relative to the first portion.

7. A regulator according to claim 1, wherein the means for opposing upward vertical displacement of the rating mass relative to the valve are means that are retractable to enable the regulator to be disconnected from the valve body.

8. A regulator according to claim 7, wherein the retractable means comprise a resiliently retractable retaining ring disposed in one of the rating mass and the valve body, co-operating with an associated radial shoulder formed in the other one of the valve body and the rating mass.

* * * * *